United States Patent [19]

Hydes

[11] 4,203,102

[45] May 13, 1980

[54] CHARACTER DISPLAY SYSTEM

[75] Inventor: Alan F. Hydes, Southampton, England

[73] Assignee: International Business Machines Corporation, Armonk, N.Y.

[21] Appl. No.: 957,371

[22] Filed: Nov. 2, 1978

[30] Foreign Application Priority Data

Nov. 16, 1977 [GB] United Kingdom ............... 47672/77

[51] Int. Cl.[2] ............................................... G06F 3/14

[52] U.S. Cl. .................................... 340/723; 340/724; 340/750; 340/789; 340/801

[58] Field of Search ............... 340/723, 724, 745, 748, 340/750, 789, 791, 801, 728

[56] References Cited

U.S. PATENT DOCUMENTS

| | | | |
|---|---|---|---|
| 3,665,450 | 5/1972 | Leban | 340/748 |
| 3,786,478 | 1/1974 | King, Jr. | 340/728 |
| 3,809,629 | 4/1974 | Walsh et al. | 340/711 |
| 3,846,784 | 11/1974 | Sinclair | 340/755 |
| 3,895,374 | 7/1975 | Williams | 340/723 |
| 3,918,038 | 11/1975 | Stonelake | 340/791 |
| 3,976,982 | 8/1976 | Eiselen | 340/723 |
| 4,054,948 | 10/1977 | Grier | 340/724 |
| 4,146,877 | 3/1979 | Zimmer | 340/723 |
| 4,153,940 | 5/1979 | Grier | 340/724 |

*Primary Examiner*—Marshall M. Curtis
*Attorney, Agent, or Firm*—Frederick D. Poag

[57] ABSTRACT

A display system is described in which left to right or right to left mode may be displayed without character inversion. A read/write store is added between a display buffer and a CRT. This store stores one complete scan line of character slice bytes in sequence. The bytes may be read out either in a normal sequence or in a reversed sequence for display. As bytes are read in parallel, the orientation of individual characters is unchanged.

One line of control data or selected lines may always be displayed in left to right mode, while the remainder of the display is in right to left mode.

10 Claims, 7 Drawing Figures

CHARACTER SLICE AND CONTROL WORD STORAGE

CHARACTER SLICE AND CONTROL WORD STORAGE

CHARACTER DISPLAY SYSTEM

FIELD OF THE INVENTION

This invention relates to a character display system and has particular application to an alphanumeric display system using a dot matrix.

BACKGROUND OF THE INVENTION

Display systems for displaying alphanumeric characters have been available commercially for several years. An example of such a display is the 3270 Information Display System manufactured by International Business Machines Corporation which is described in Systems Manual GA27-2749-5, File No. S360/S370/Sc-09 entitled "IBM 3270 Information Display System Component Description".

Alphanumeric display systems are normally designed to display Latin type languages such as English, German, French and other European languages where characters are written and read from left to right. However, Middle East countries use Hebrew, Farsi or Arabic languages which are written and read in the reverse direction from right to left. As Latin type languages are also used commercially in these countries, there is a requirement for a display system in which entered words can be displayed either in a normal left to right mode for Latin type languages or in a reverse right to left mode for Middle East languages.

One known method of reversing a display is to reverse the scan coils driving the CRT causing a raster to be produced which scans from right to left. Also the characters must be individually reversed so that they are displayed in normal orientation. This prior art method involved permanent rewiring and is not particularly suitable for the selective normal or reversed operation.

SUMMARY OF THE INVENTION

According to the present invention a display system in which characters may be displayed either in a normal left to right mode or in a reverse right to left mode comprises a display buffer for storing characters to be displayed, a read/write store for storing one complete scan line of character slice bytes as storage words in a predetermined sequence and means to read out the storage words in parallel from said read/write store selectively either in the predetermined sequence or in a reverse sequence to a parallel to serial converter for display whereby data is displayed selectively either in a normal left to right mode or in a reverse right to left mode, with individual characters having unchanged orientation.

According to another aspect a method of manipulating data in a display system in which characters may be displayed either in a normal left to right mode or in a reverse right to left mode comprises storing characters to be displayed in a display buffer, storing one complete scan line of character slice bytes as storage words in a predetermined sequence in a read/write store reading out the storage words in parallel with constant orientation from the read/write store either in the predetermined sequence or in a reverse sequence and converting the parallel words to serial scan line data for display whereby data is displayed selectively either in a normal left to right mode or in a reverse right to left mode with individual characters having unchanged orientation.

BRIEF DESCRIPTION OF THE DRAWINGS

In order that the invention may be more readily understood, reference will now be made, by way of example to the accompanying drawings in which.

DETAILED DESCRIPTION

Figure 1:
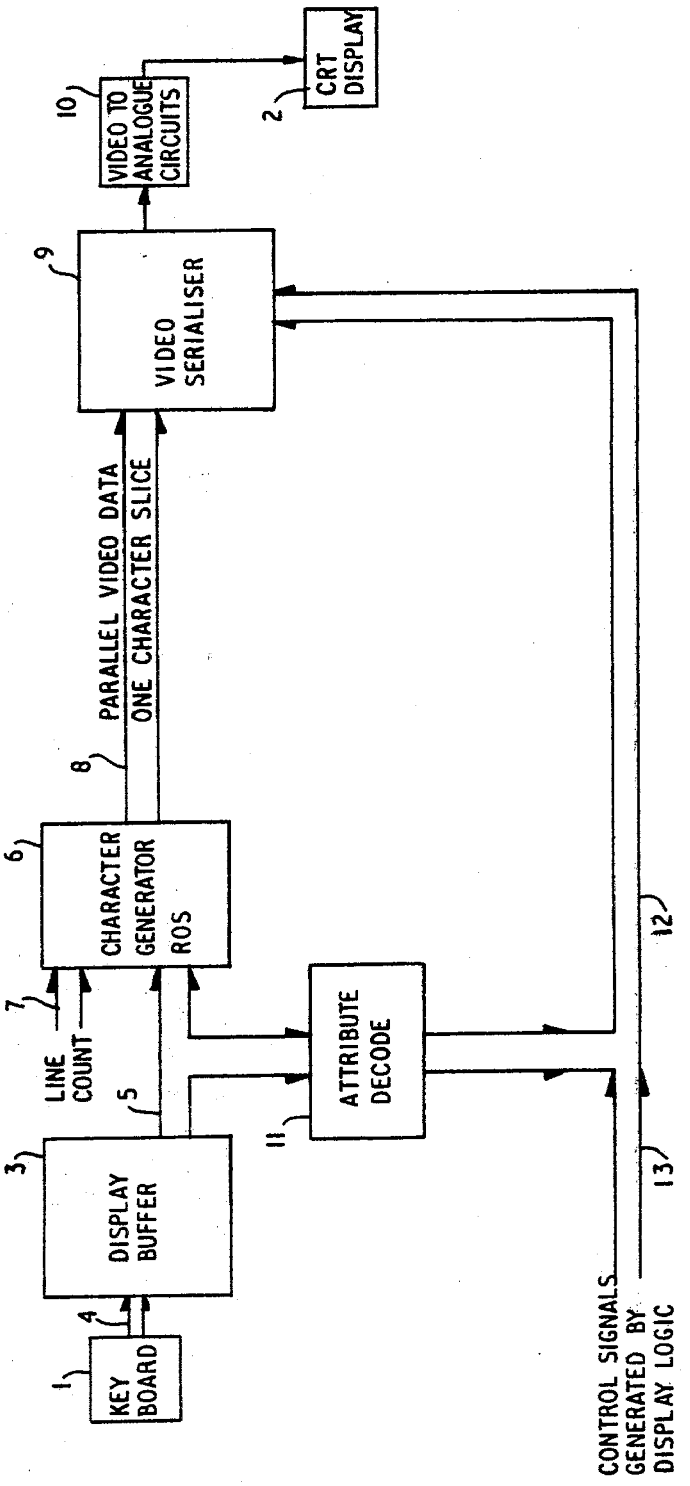
FIG. 1 is a block diagram of a portion of a prior art alphanumeric display system.

Referring now to FIG. 1 which shows a portion of a prior art alphanumeric monochrome display system including a keyboard 1 for data entry by an operator and a CRT screen display 2 for displaying alphanumeric data keyed in by the operator or entered by a controller (not shown). Prior art display systems having a block diagram generally as FIG. 1 are the IBM 3277 and 3278 display systems manufactured by International Business Machines Corporation.

Display buffer 3 stores alphanumeric and attribute data as eight bit bytes and has sufficient capacity to store a complete single screen of data. An attribute byte appears in CRT display 2 as a blank, and is included to control the alphanumeric data following until the next attribute byte. For example an attribute byte is BRIGHT UP which means that the following alphanumeric characters will be displayed brighter than normal. This attribute may be terminated by an attribute byte NORMAL. Following this, characters will be displayed at normal intensity.

When an operator enters alphanumeric data by keying keyboard 1, code representing key position is transmitted to the control circuitry which, in this example, translates the code into an eight bit byte representing the keyed character. This eight bit byte is sent to be stored in display buffer 3 along data bus 4. Display buffer 3 is a fixed format store with each store byte location corresponding to screen position. Display buffer 3 is continuously read out at 60 Hertz to refresh interlaced CRT display 2.

The character and attribute bytes are read out along data bus 5 to character generator ROS 6. This character generator is a read-only-store (ROS) which converts from an eight bit alphanumeric character byte to a 9 wide by 16 high dot matrix format under the control of line count 7. Line count 7 starts at 1 and counts up to 16, and thus each line count corresponds to one slice of the dot matrix. At each line count data bus 8 transmits parallel video data representing one complete scan line of the required 9 bit character bytes.

Data bus 8 transmits the parallel video data to video serializer 9 which converts the 9 bit character slice to a 9 bit serial character slice. Thus at each line count, video serializer 9 generates a video signal representing the dots to be displayed along a single scan line of CRT display 2. Between video serializer 9 and CRT display 2 are conventional video to analogue circuits to drive the CRT display.

Attribute decode 11 recognizes attribute bytes on data bus 5 and generates a signal which is fed along control bus 12 to video serializer 9 to blank out any attribute video data which might appear on data bus 8, so that an attribute character always appears as a blank on CRT display 2.

Attribute decode 11 also responds to attribute characters and generates appropriate control signals on control bus 12 to instruct video serializer 9 to implement the attribute character. Also control bus 12 transmits other control signals generated by display logic (not shown) on control bus 13 such as cursor position. The cursor is a line of character width on the display which shows the operator the next position into which a character may be entered.

Figure 2:
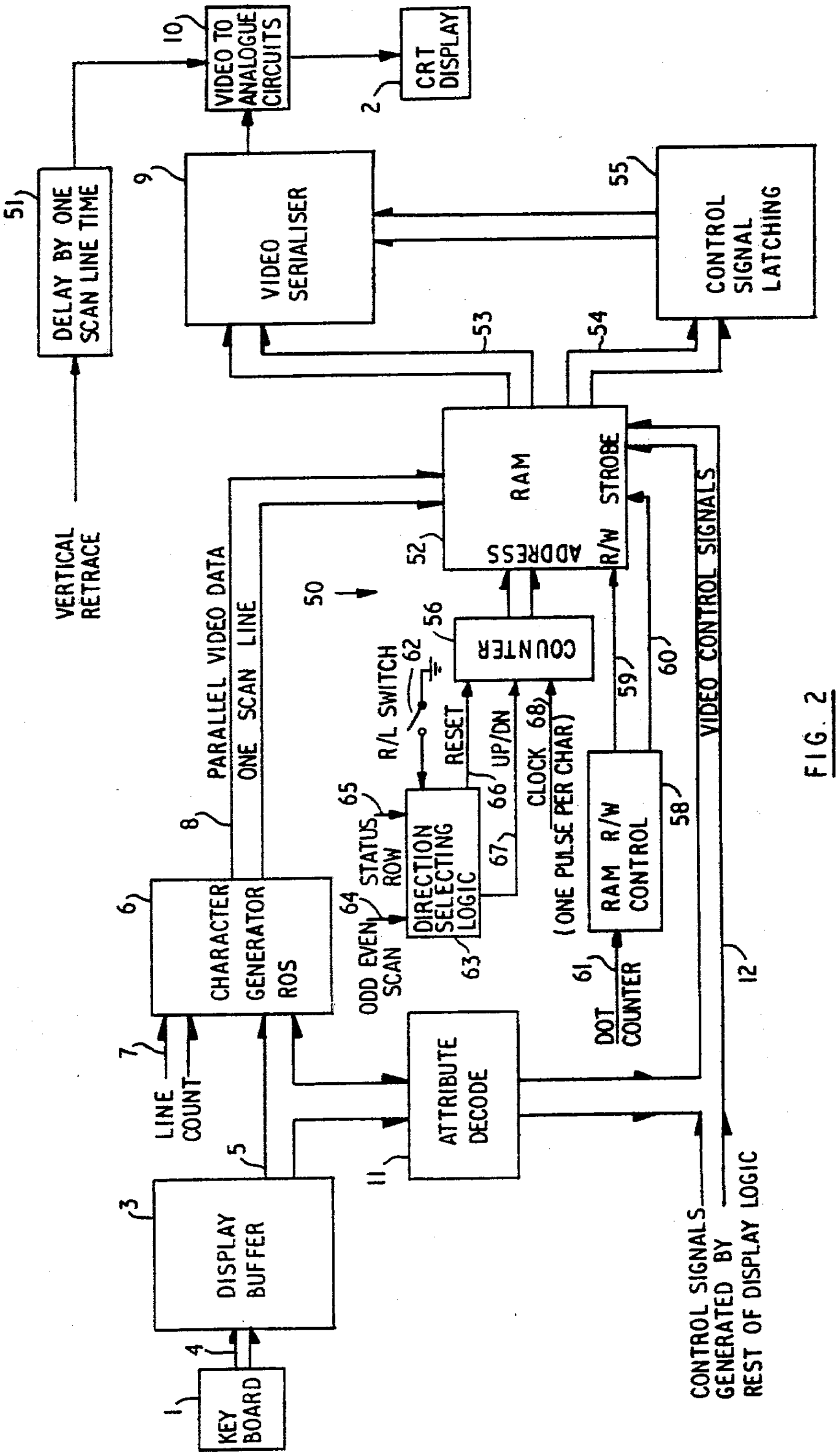
FIG. 2 is a block diagram of a portion of an alphanumeric display system embodying the present invention with selective normal left to right or reverse right to left character display.

FIG. 2 is a block diagram of a portion of a display system embodying the present invention which may be switched to either a normal left to right display mode or to a reverse right to left mode. It will be noted that several of the blocks in FIG. 2 have the same function as blocks in FIG. 1 and wherever possible have the same identification number. However, before describing FIG. 2 in detail, it is necessary to describe the actual display produced by the system of FIG. 3 as shown in FIGS. 3 to 5.

Figure 3:
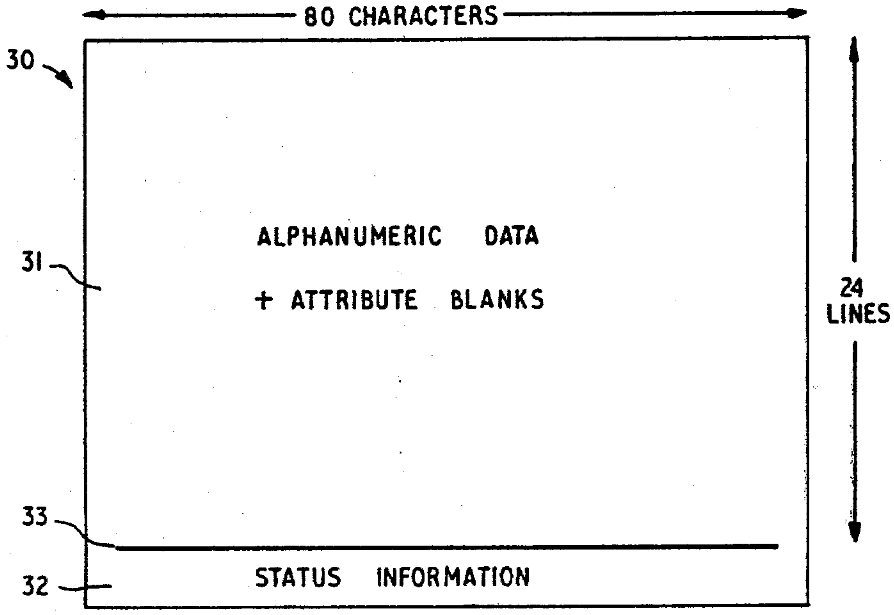
FIG. 3 illustrates the screen layout for the display system of FIG. 2.

FIG. 3 illustrates a CRT screen having a rectangular shaped display area shown generally at 30 which consists of two poritions, an upper alphanumeric data and attribute blanks portion 31 and a lower status information portion 32 which displays the status of the display system for use by an operator. The two portions are separated by a continuous displayed line 33.

The upper data portion 31 displays alphanumeric data keyed on a keyboard by an operator and may contain 24 lines, each of 80 characters. This upper portion 31 is effectively divided into 80 by 24 character cells each of which consits of a plurality of permissable dot positions. These positions are arranged in a rectangular matrix 9 dots wide by 16 dots high. An alphanumeric character occupies a central portion of a cell and is displayed by a matrix of dots 7 dots wide and 9 dots high. This is necessary to allow for character separation in the horizontal and vertical directions as in this example character cells are contiguous. It may be noted that although an attribute character is processed by the system as a data byte, it is displayed on screen 30 as a blank character cell.

Figure 4:
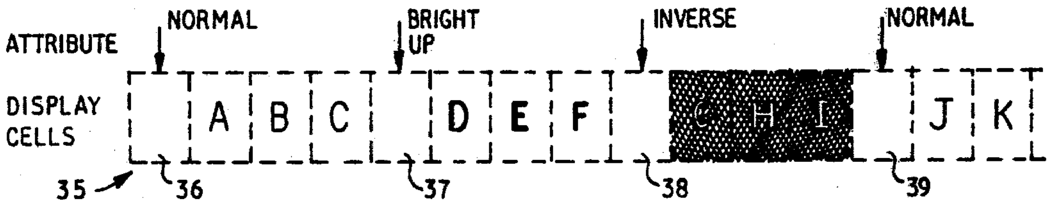
FIG. 4 illustrates schematically the use of attribute characters to display letters in the display system of FIG. 2.

FIG. 4 illustrates the use of attribute characters by the system to display a portion of a line of letters shown generally at 35. A line of character cells is shown, each outlined by a dashed line, with attribute characters shown above.

As noted earlier, in this example, attribute characters always appear on the display screen as blanks, but control how subsequent alphanumeric characters are displayed until the next attribute character occurs. Attribute characters are inserted by a program controlling the system to give a formatted display. In FIG. 3, each attribute character is followed by three character display cells, purely as an example.

It is assumed that operator keys in the letters ABC. These letters start from the left and are of normal intensity as controlled by a NORMAL attribute represented by a blank character cell 36. The next blank cell 37 represents the attribute BRIGHT UP and whn an operator keys in the letters DEF these are displayed at high intensity. Subsequently blank cell 38 represents the attribute INVERSE and so the following letters GHI appear as dark characters on a white background whereas characters are otherwise displayed as white on a dark background. After cell 39 representing the attribute NORMAL, letters JK are displayed at normal intensity as at the start of the line.

Figure 5A:
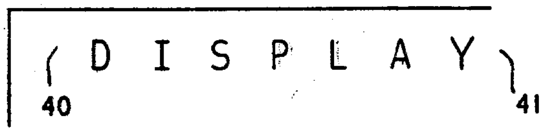
FIG. 5A illustrates the display of letters by the system of FIG. 2 when switched to operate in a normal left to right mode.
Figure 5B:
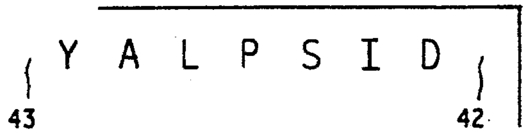
FIG. 5B illustrates the display of letters by the system of FIG. 2 when switched to operate in a reverse right to left mode.

The terms "normal left to right" and "reverse ht to left" as used in this specification will be defined with reference to FIGS. 5A and 5B. In languages having a written format based upon Latin, eg English, German, French and other European languages, writing or typing, starts at the left and continues rightwards. This is illustrated in FIG. 5A where the letters DISPLAY start in the left 40 and continue to the right 41. This is termed a normal left to right mode which is the direction used during writing, typing and reading.

However certain languages such as Hebrew, Farsi, Arabic are read and typed in the opposite direction as illustrated in FIG. 5B. In this illustration the word DISPLAY appears as YALPSID which is in reverse right to left mode. Assuming this was being typed, the first letter D would appear on the right 42 and subsequent letters added in a leftwards direction towards the left 43. It should be noted that the individual letters are not reversed and have normal orientation, but that only the direction in which letters are shown is reversed. This mode is termed the reverse right to left mode, being read from right to left.

In the Hebrew language, although letters appear in the reverse right to left mode, numbers are in the normal left to right mode. This reverse order of numbers as compared to letters can be reproduced by the display system of FIG. 2 by microprogramming, but as it forms no part of the present invention, will not be described herein.

The display system illustrated in FIG. 2 may be switched to operate in a normal left to right mode or to a reverse right to left mode and will now be described. The system has an input keyboard 1 and an output CRT display 2 having a screen format as shown in FIG. 3.

In general, the display system of FIG. 2 is based upon the system of FIG. 1 but the output from character generator 6 is taken to logic and storage blocks 50 for processing before being applied to video serializer 9. The functional blocks of the system already described with reference to FIG. 1 are essentially unchanged and so will not be described in detail again.

As previously, alphanumeric and attribute bytes are read out from display buffer 3 to character generator ROS 6. The data read out from character generator 6 are delayed by one scan line time to allow for processing by logic and storage blocks 50. This requires delay of the vertical retrace by delay 51 to generate a signal to synchronize the video to analogue circuits 10.

During this period the parallel video data consisting of 80 9 bit bytes representing one complete scan line of 80 characters are transferred along parallel bus 8 to random access memory RAM 52 and stored. RAM 52 also stores control signals from attribute decode 11 and from other display logic on control bus 12. Each word in the store consists of a 9 bit character slice plus 6 bits for associated attribute and control. During the next scan line time the 80 stored words are ready out sequentially. The 9 bit bytes representing character slices are read out along parallel bus 53 to video serializer 9 and the 6 bit bytes representing associated attributes are read out on parallel bus 54 to control signal latching 55.

It will be recalled that display buffer 3 stores alphanumeric characters and attribute characters as separate bytes in sequence with each attribute byte controlling following alphanumeric character bytes until the next attribute byte occurs. However, this should be contrasted with storage in RAM 52 where each storage word consists of an alphanumeric character slice byte and an associated attribute/control byte.

As RAM 52 words are arranged in this way, and whole words are read out in parallel, the 9 byte character slice bytes always have the same constant orientation on parallel bus 53, independent of the sequential order in which individual words are read out. Thus RAM 52 can be read out either with words in a normal left to right sequence or in a reverse right to left sequence. In both cases the orientation of character slices and thus characters is as normal, as illustrated in FIGS. 5A and 5B.

Figure 6:
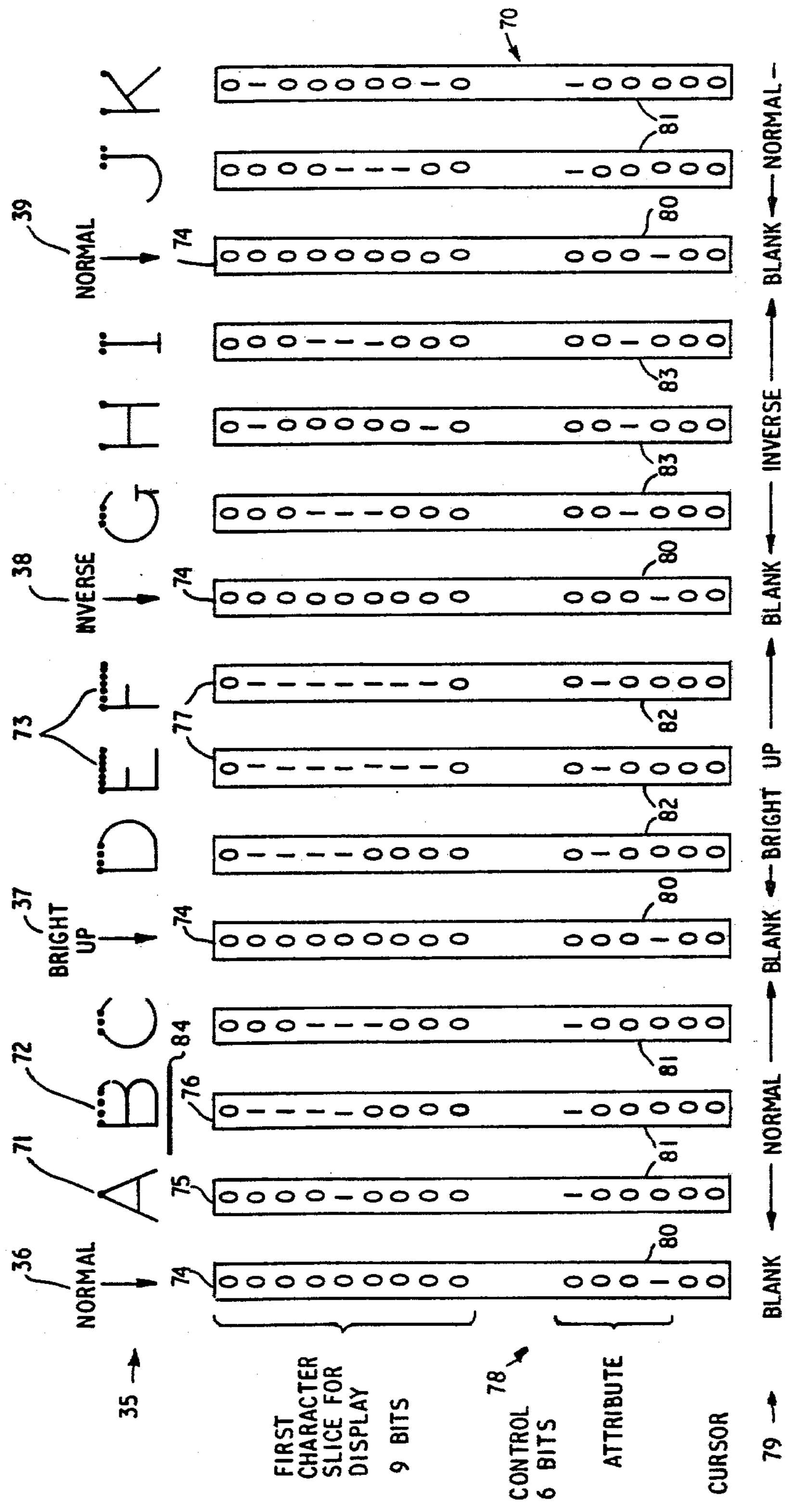
FIG. 6 is a schematic diagram showing how the top slice of an attribute and alphabetic sequence are stored as character slice/control words.

FIG. 6 shows in detail how an attribute and alphabetic slice sequence are stored in RAM 52 as character dot slice and control words 70. It will be observed that the line of attributes and characters A to K is as shown in FIG. 4. In these letters the upper portion of each is shown as a number of dots to represent the first character slice for display. For example the apex of letter A is represented by a single dot 71 whereas the top stroke of the letter B is represented by four dots 72. It will be recalled that a character cell has a width of 9 dots and thus letters E and F with a full upper stroke are each represented by 7 dots 73 to allow for character spacing.

As attribute characters NORMAL 36, 39, BRIGHT UP 37 and INVERSE 38 appear as a blank character cell when displayed, they are represented by blanks among the letters shown generally at 35. Character dot slice and control words 70 consist of 9 bits representing the possible 9 dots which would display as a line of dots occupying the full width of a cell together with 6 control bits.

In the case of attributes, as a blank is to be displayed the character dot slice stored consists of nine "0"s as shown at 74. For the alphabetic characters the 1 bits in the storage word corresponds directly to the number of dots to be displayed in the slice. For example A having a single central dot 71 is represented by 000010000 at 75, B having 4 dots 72 becomes 011110000 at 76, E and F with 7 dots 73 become 011111110 at 77.

The 6 control bits are shown generally at 78 with the upper 4 bits designating the attribute 79 associated with each character slice byte. In the case of a word representing an attribute character which will be displayed as a blank, the code is 0001 at 80. This code is recognized by system logic to inhibit video serializer 9 at the correct time to ensure a blank is displayed.

The attribute NORMAL is represented by a code 1000 at 81, BRIGHT UP code 0100 at 82 and INVERSE by 0010 at 83, each associated with the character slices which they control. Each code will be recognized by system logic to implement the coded attribute, for example 0010 at 83 (INVERSE) will result in control of video serializer 9 to invert the bits of each associated character slice byte.

Of the two remaining control bits one is allocated to display a cursor 84. The cursor is a continuous marker line of cell width which is displayed when a "1" occurs in the control word of the appropriate character slice. One other control bit is shown which may be allocated to another special display function. In any particular display design additional control bits may be required for other required display functions, eg color functions in a color display.

Referring again to FIG. 2. As already explained all signals from display buffer 3 are delayed for a period of one scan line during which time they are stored as 15 bit words in RAM 52. The use of RAM 52 allows the sequence of words to be reversed or read out to give a left to right, or right to left display.

This delay of one scan line allows efficient use of RAM 52 as immediately a word from one scan line is read out, a word from the next scan line is written into the same storage location. Then the RAM address is altered to the next location. This means a constant up and down cycling through storage addresses whilst the display is operating in reverse right to left mode.

Thus for normal left to right display a first character slice is stored in RAM 52 locations (ie scan line addresses) from 1→80 and read out in the same sequence. During read out, the next character slice is stored in locations 1→80 replacing words from the first character slice. Thus this addressing is controlled by a counter 56 which counts from 1 to 80 and is then reset to 1 for the next count.

However for a reverse right to left display, a first character slice is stored in RAM 52 locations 1→80 but read out in reverse sequence 80→1. Thus, as the next character slice replaces the first, it is stored in a sequence 80→1 and read out in reverse sequence 1→80. Thus counter 56 must also be operable in an up/down counting mode.

In the case of normal left to right display, reading must always be in the same sequence as storing. Thus, if a change of mode from reverse right to left occurs after an 80→1 read, the simultaneous store will be 80→1 and subsequent sequences are 80→1.

As character dot slice bytes are read out on parallel bus 53 whilst associated control bytes are read out on parallel bus 54 synchronization of the two byte streams is required at video serializer 9. This is carried out by Control Signal Latching 55 in which control bytes are latched to retain control bytes during the desired time period. This circuit block may also include a delay to keep the control bytes in step with the character bytes.

Read/write of RAM 52 is controlled by RAM read/write control 58 which produces a read or write signal on line 59 and a strobe pulse on line 60. Timing of this circuit block is on line 61 which provides one pulse for each dot from a dot counter.

Address selection of RAM 52 is performed by counter 56 whose operation has already been described briefly. A R/L switch 62 selects normal left to right display mode when open and reverse right to left display mode when closed. Switch 62 supplies one input to Direction Selection Logic 63, which has also an Odd/Even Scan signal 64 and Status Row signal 65 inputs.

When switch 62 is open, selecting normal left to right mode, Direction Selection Logic 63 provides a Reset signal 66 at the end of each character slice so that counter 56 continually counts 1→80 is reset to 1 and then counts 1→80 again. Timing of counter 56 is by a clock supplying one pulse per character on line 68.

When switch 62 is closed, selecting reverse right to left mode, Direction Selection Logic 63 recognizes Odd/Even Scan input signal 64 and at the end of each character slice provides an Up/Down input signal 67 to Counter 56. This makes counter 56 reverse at the end of each scan and so counts 1→80, 80→1 repeatedly.

FIG. 3 shows a single line 32 of Status Information which is always displayed in a normal left to right mode and 24 lines of alphanumeric data 31 which may be displayed either in normal left to right mode or reverse right to left mode. When reverse right to left mode is selected by switch 62, direction selection logic 65 must control counter 56 to count 1→80 repeatedly to display Status Information 32. This is accomplished by Status Row Signal 65 being recognized by Direction Selection Logic 65. This signal is produced by system logic and is only on when Status Row Information 32 character slices are scanned.

Interlacing does not affect the concepts of the embodiment of invention described, but affects the design of the detailed logic for implementation.

An alternative feature allows the selection of the direction in which any part of the screen should be displayed. This may be accomplished by replacing Status Row Signal 65 by a signal from a register having 25 bits, i.e. one bit for each row of screen characters. Each bit represents normal left to right if it is "0" or reverse right to left if it is a "1". This register is used to generate an alternative signal 65 when each character row is displayed to indicate the direction of display. This register allows the screen to be formatted with respect to display direction. The register is loaded under program control. As an alternative, an attribute may be allocated to specify the direction of a line or the following line.

RAM 52 may be replaced by a parallel shift register which will be 15 bits wide and 80 bits long in the system described earlier. This must be capable of bidirectional shifting with selective read/write at each end to provide storage and sequence reversal.

The monochrome display system already described may be adapted for color display by allocating attribute to color functions, e.g. display RED, GREEN or YELLOW. Also color functions may be controlled by additional control bits.

Having thus described my invention, what I claim as new, and desire to secure by Letters Patent is:

1. A display system utilizing a given display element accessing pattern in which characters may be displayed either in a normal left to right mode or in a reverse right to left mode comprising a display buffer for storing characters to be displayed, a read/write store for storing one complete scan line of character slice bytes as storage words in a predetermined sequence and means to read out the storage words in parallel with constant orientation from said read/write store selectively either in the predetermined sequence or in a reverse sequence to a parallel to serial converter for display, whereby data is displayed selectively either in a normal left to right mode or in a reverse right to left mode, with individual characters having unchanged orientation, without requiring alteration of said pattern.

2. A display system as claimed in claim 1 in which attributes for controlling the manner of character display are stored in said display buffer, each attribute being associated with one or more characters, and said read/write store stores words having a character slice byte and an attribute byte to associate an attribute with each character slice byte.

3. A display system as claimed in claim 1 or claim 2 in which each storage access to a word comprises a read out for a first scan line followed by a write for the next scan line.

4. A display system as claimed in claim 1 or claim 2 in which said storage words have scan line addresses 1 to N, comprising a counter controlled by direction selection logic for generating scan line addresses, the counter counting repeatedly from 1 to N or from N to 1 when the normal left to right mode is selected and counting from 1 to N and back to 1 when the reverse right to left mode is selected.

5. A display system as claimed in claim 4 comprising means to generate an input signal to the direction selection logic to specify the mode in which a character row is displayed.

6. A display system as claimed in claim 5, in which at least one line of data may be displayed in a normal left to right mode comprising an input to the direction selection logic when said at least one line is to be displayed whereby the counter counts repeatedly from 1 to N or from N to 1.

7. A display system as claimed in claim 1 in which each storage word stored by said read/write store comprises a character slice byte, an attribute byte and additional control bits.

8. A method of manipulating data in a display system utilizing a given display element accessing pattern in which characters may be displayed either in a normal left to right mode or in a reverse right to left mode comprising storing characters to be displayed in a display buffer, storing one complete scan line of character slice bytes as storage words in a predetermined sequence in a read/write store, reading out the storage words in parallel with constant orientation from the read/write store either in the predetermined sequence or in a reverse sequence and converting the parallel words to serial scan line data for display, whereby data is displayed selectively either in a normal left to right mode or in a reverse right to left mode with individual characters having unchanged orientation, without requiring alteration of said pattern.

9. A method as claimed in claim 8 comprising storing attributes for controlling the manner of character display in said display buffer with each attribute being associated with one or more characters and storing words in said read/write store each having a character slice byte and an attribute byte whereby an attribute is associated with each character slice byte.

10. A display system as claimed in claim 4, in which at least one line of data may be displayed in a normal left to right mode comprising an input to the direction selection logic when said at least one line is to be displayed whereby the counter counts repeatedly from 1 to N or from N to 1.

* * * * *